US012181831B2

(12) United States Patent
Terakawa

(10) Patent No.: US 12,181,831 B2
(45) Date of Patent: Dec. 31, 2024

(54) IMAGE FORMING APPARATUS

(71) Applicant: CANON KABUSHIKI KAISHA, Tokyo (JP)

(72) Inventor: Shogo Terakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/473,068

(22) Filed: Sep. 22, 2023

(65) Prior Publication Data

US 2024/0111249 A1 Apr. 4, 2024

(30) Foreign Application Priority Data

Sep. 29, 2022 (JP) ................................ 2022-156436

(51) Int. Cl.
*G03G 21/20* (2006.01)

(52) U.S. Cl.
CPC .................................. *G03G 21/206* (2013.01)

(58) Field of Classification Search
CPC .................................................... G03G 21/206
USPC ............................................................ 399/92
See application file for complete search history.

(56) References Cited

U.S. PATENT DOCUMENTS 9,158,276 B2 * 10/2015 Konishi ............... G03G 21/206

FOREIGN PATENT DOCUMENTS

CN 103529677 * 1/2014
JP 2009-217149 9/2009

* cited by examiner

*Primary Examiner* — Hoan H Tran
(74) *Attorney, Agent, or Firm* — Venable LLP

(57) ABSTRACT

An image forming apparatus includes a casing, a fan unit, a support member interposed between the casing and the fan unit, and an elastic member arranged between the support member and the casing. The first duct includes a fixing portion fixed to the casing, the fixing portion being provided on a first side of the fan unit in a first direction. One of the second duct and the support member includes a support projection provided on a second side, opposite to the first side, of the fan unit, and the other one of the second duct and the support member includes a support hole portion defining a support hole. On the second side, the fan unit is supported on the casing via the support member when the support projection is inserted to the support hole and a gap is provided between the support projection and the support hole portion.

10 Claims, 8 Drawing Sheets

IMAGE FORMING APPARATUS

BACKGROUND OF THE INVENTION

Field of the Invention

The present invention relates to image forming apparatuses such as a printer, a copying machine, a facsimile, or a multifunction machine.

Description of the Related Art

Hitherto, image forming apparatuses are equipped with a fan unit that flows air into a casing to perform heat exhaustion, cooling, air ventilation, dust collection, and suction and conveyance of recording materials. The fan unit includes a fan that generates airflow, and a duct that forms an air channel through which the air is flown by the operation of the fan (Japanese Patent Application Laid-Open Publication No. 2009-217149). The fan unit is supported in the image forming apparatus by a part of a frame constituting the casing.

However, if vibration of the fan is propagated through the frame to devices such as a photosensitive member or an exposing unit, image defects may occur in which an actual image is deviated from the desired image position, causing visual unevenness. For example, in an exposing unit that forms electrostatic latent images to the photosensitive member, if the vibration is propagated to a reflection mirror that adjusts a path of a laser beam in accordance with a rotation cycle of the fan, the electrostatic latent image formed on the photosensitive member may be deviated periodically from the desired position. This may cause periodical image defects, so-called banding, to be formed on the recording material.

Therefore, in the apparatus disclosed in Japanese Patent Application Laid-Open Publication No. 2009-217149, a first end side of the duct to which the fan is attached is fixed to the frame, and a second end side of the duct is supported with a certain degree of freedom on the frame through an elastic member. Thereby, it becomes possible to suppress the propagation of the vibration of the fan unit to the exposing unit through the frame.

In response to the recent increase in printing speed of the image forming apparatus, the fan unit is required to realize a high performance, and a fan unit equipped with high power fans is adopted. The high power fans generate a great vibration, and along therewith, the vibration of the fan unit is increased, but according to the conventional apparatus disclosed in Japanese Patent Application Laid-Open Publication No. 2009-217149, there was a risk that the vibration may be propagated from the fan unit to the frame at the first end side where the fan unit is fixed to the frame. It may be possible to adopt elastic members with greater thickness or to increase the number of elastic members, but such measures are not preferable since they complicate the configuration for arranging the elastic members.

The present invention provides an image forming apparatus capable of suppressing the propagation of the vibration of the fans from the fan unit to the frame by a simple configuration.

SUMMARY OF THE INVENTION

According to a first aspect of the present invention, an image forming apparatus includes a casing supporting a process unit configured to execute at least a part of an image forming process, a fan unit including a first duct and a second duct forming an air channel by being mutually connected, and a fan attached to the second duct and configured to generate an airflow in the air channel, support member interposed between the casing and the fan unit, and supporting the fan unit with respect to the casing, and an elastic member arranged between the support member and the casing. The first duct includes a fixing portion fixed to the casing, the fixing portion being provided on a first side of the fan unit in a first direction. One of the second duct and the support member includes a support projection provided on a second side, opposite to the first side, of the fan unit in the first direction, and the other one of the second duct and the support member includes a support hole portion defining a support hole to which the support projection is inserted. On the second side, the fan unit is supported on the casing via the support member in a state where the support projection is inserted to the support hole and a gap is provided between the support projection and the support hole portion.

Further features of the present invention will become apparent from the following description of exemplary embodiments with reference to the attached drawings.

DESCRIPTION OF THE EMBODIMENTS

Image Forming System

Figure 1:
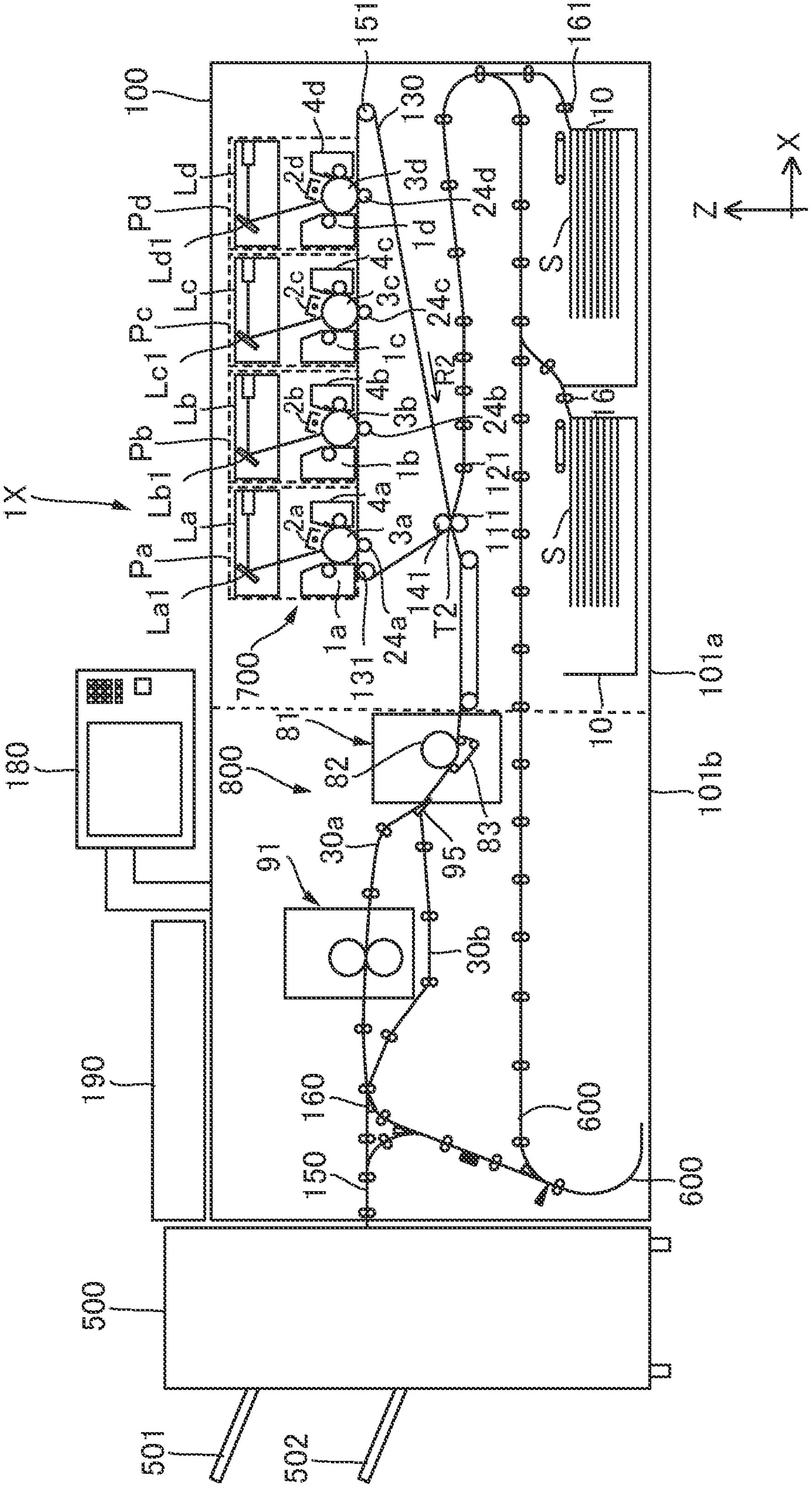
FIG. 1 is a schematic drawing illustrating an image forming system equipped with an image forming apparatus according to a present embodiment.

A general configuration of an image forming system equipped with an image forming apparatus according to a present embodiment will be described with reference to FIG. 1. An image forming system 1X illustrated in FIG. 1 includes an image forming apparatus 100 and a finisher apparatus 500. The image forming apparatus 100 and the finisher apparatus 500 are connected in a manner capable of conveying a recording material S therebetween. In the present embodiment, the finisher apparatus 500 is a postprocessing unit that may be attached subsequently to the image forming apparatus 100 for function enhancement, and it may perform a postprocessing described below to the recording material S to which a toner image has been fixed by the image forming apparatus 100.

Image Forming Apparatus

The image forming apparatus 100 is a tandem-type full-color printer adopting an electrophotographic system, and includes a first casing 101$a$ and a second casing 101$b$. The second casing 101$b$ is arranged downstream of the first casing 101*a* in a conveyance direction of the recording material S, that is, opposite direction from arrow X, and wherein the first casing 101*a* and the second casing 101*b* are mutually connected in a manner capable of conveying the recording material S therebetween. Various devices such as an image forming unit 700 for realizing a process for conveying the recording material S and transferring a toner image thereto are arranged in the first casing 101*a*. That is, the first casing 101*a* is one example of a casing, and supports image forming units Pa, Pb, Pc, and Pd which are process units for executing at least a part of the image forming process. Meanwhile, various devices such as a fixing unit 800 that realize a process for conveying the recording material S and fixing a toner image thereto are arranged in the second casing 101*b*. Further, various devices such as an operation unit 180 including a display unit that displays various information at a front side of the apparatus and keys through which various information can be entered by the operation of a user are also arranged in the second casing 101*b*.

In the present specification, a side on which the user stands when manipulating the operation unit 180 to operate the image forming apparatus 100 is referred to as a front side, or front, and an opposite side thereof is referred to as a rear side, or back. Further, a left side when the image forming apparatus 100 is viewed from the front is called left, and a right side when viewed from the front is called right. The front side is a first side in the front-rear direction, and the rear side is a second side opposite from the first side in the front-rear direction. In the drawings, an X axis direction denotes a right-left direction, i.e., third direction, a Y axis direction denotes a front-rear direction, i.e., first direction, and a Z axis direction denotes an up-down direction, i.e., second direction.

The image forming apparatus 100 includes four image forming units Pa, Pb, Pc, and Pd respectively forming yellow, magenta, cyan, and black images. The image forming apparatus 100 forms a toner image on the recording material S according to an image signal received from a document reading apparatus 190 that reads image signals from documents or from an external apparatus such as a personal computer not shown. Further, according to the present embodiment, the image forming unit 700 for forming toner images on the recording material S is composed of the image forming units Pa to Pd, primary transfer rollers 24*a* to 24*d*, an intermediate transfer belt 130, a plurality of rollers 131, 141, and 151, and a secondary transfer outer roller 111. Further, examples of the recording material S include paper such as normal paper, thick paper, rough paper, uneven paper and coated paper, plastic films, and cloths.

As illustrated in FIG. 1, the image forming units Pa to Pd are arranged in an aligned manner along a direction of movement of the intermediate transfer belt 130. The intermediate transfer belt 130 is stretched across a plurality of rollers (131, 141, and 151) and moved in the direction of arrow R2. The intermediate transfer belt 130 bears and carries a toner image that has been primarily transferred thereto as described below. The secondary transfer outer roller 111 is arranged at a position opposing to a secondary transfer inner roller 141 across which the intermediate transfer belt 130 is stretched, with the intermediate transfer belt 130 interposed therebetween, forming a secondary transfer portion T2 where the toner image on the intermediate transfer belt 130 is transferred to the recording material S. The fixing unit 800 is arranged downstream in the direction of conveyance of the recording material at the secondary transfer portion T2.

A plurality of, the number of which is two according to the present example, cassettes 10 in which the recording materials S are stored are arranged in the image forming apparatus 100. Recording materials S having different sizes and thicknesses are stored in these cassettes 10, and a recording material S is selectively conveyed from one of the cassettes 10. The recording material S is conveyed from the cassette 10 by a conveyance roller 161 via a conveyance path toward a registration roller 121. Thereafter, by having the registration roller 121 rotate in synchronization with the toner image formed on the intermediate transfer belt 130, the recording material S is conveyed toward the secondary transfer portion T2. The recording material S placed on a manual sheet feed portion (not shown) can be conveyed, in addition to the recording material S stored in the cassettes 10.

The image forming units Pa, Pb, Pc, and Pd adopt a substantially similar configuration except for the differences in the developed color of the toner image. Therefore, in the present example, the yellow image forming unit Pa will be described as a representative example, and the description of other image forming units Pb, Pc, and Pd will be omitted.

A cylindrical photosensitive drum 3*a* is arranged in the image forming unit Pa. The photosensitive drum 3*a* is driven to rotate by a motor not shown. A charging unit 2*a*, an exposing unit La, a developing apparatus 1*a*, a primary transfer roller 24*a*, and a drum cleaning unit 4*a* are arranged in the circumference of the photosensitive drum 3*a*. In the present embodiment, the photosensitive drum 3*a*, the charging unit 2*a*, the exposing unit La, and the developing apparatus 1*a* correspond to a processing member for executing a part of the image forming processes for forming an image on the recording material S. That is, the image forming units Pa, Pb, Pc include the exposing unit La configured to irradiate a charged surface of the photosensitive drum 3*a* with laser light to form an electrostatic latent image.

A process for forming a full-color image by the image forming apparatus 100 will be described as an example. At first, when the image forming operation is started, a surface of the photosensitive drum 3*a* being rotated is charged uniformly by the charging unit 2*a*. The charging unit 2*a* may be a corona charger that irradiates charged particles accompanying corona discharge to charge the surface of the photosensitive drum 3*a* to a uniform potential. Next, the photosensitive drum 3*a* is scanned and exposed by a laser light corresponding to the image signal generated from the exposing unit La. The exposing unit La includes a laser driver that drives the laser light emitted from a semiconductor laser on and off, and the laser light from the semiconductor laser is distributed toward the main scanning direction using a rotating polygon mirror, and the light is guided to the photosensitive drum 3*a* via a reflection mirror La1. Thereby, an electrostatic latent image corresponding to the image signal is formed on the surface of the photosensitive drum 3*a*.

The electrostatic latent image formed on the photosensitive drum 3*a* is developed into a toner image using developer containing toner and carrier stored in the developing apparatus 1*a*. The toner image formed on the photosensitive drum 3*a* is primarily transferred to the intermediate transfer belt 130 at a primary transfer portion T1 formed between the photosensitive drum 3*a* and the primary transfer roller 24*a* arranged with the intermediate transfer belt 130 interposed therebetween. In this state, a primary transfer voltage is applied to the primary transfer roller 24*a*. The toner remaining on the surface of the photosensitive drum 3*a* after primary transfer is removed by the drum cleaning unit 4*a*.

This operation is performed sequentially for each of the image forming units Pa to Pd that form yellow, magenta, cyan, and black toner images, and the toner images of four colors are superposed on the intermediate transfer belt 130. Thereafter, at a formation timing of the toner image, the recording material S stored in the cassette 10 is conveyed to the secondary transfer portion T2. Then, by having a secondary transfer voltage applied to the secondary transfer outer roller 111, a full-color toner image formed on the intermediate transfer belt 130 is secondarily transferred collectively to the recording material S. Toner remaining on the intermediate transfer belt 130 after secondary transfer is removed by a belt cleaning unit not shown.

The recording material S to which the toner image has been transferred is conveyed to the fixing unit 800. The fixing unit 800 applies heat and pressure to the recording material S to which the toner image has been transferred to thereby fix the toner image onto the recording material S. According to the present embodiment, after applying heat and pressure to the recording material S by a first fixing unit 81, further application of heat and pressure by a second fixing unit 91 may be performed selectively. The fixing unit 800 may be switched, through a switching flapper 95, between conveying the recording material S toward the second fixing unit 91 after passing through the first fixing unit 81 and conveying the recording material S while avoiding the second fixing unit 91 after passing through the first fixing unit 81.

The second fixing unit 91 is arranged downstream of the first fixing unit 81 in the direction of conveyance of the recording material S. The second fixing unit 91 is selectively used with the aim to further apply glossiness to the toner image formed on the recording material S fixed by the first fixing unit 81. For example, if the recording material S is a coated paper such as glossy paper or synthetic paper, the recording material S having passed through the first fixing unit 81 is conveyed on a fixing route 30*a* such that fixing is performed by both the first fixing unit 81 and the second fixing unit 91. In contrast, if the recording material S is a non-coated paper such as normal paper, the recording material S having passed through the first fixing unit 81 is conveyed on a bypass route 30*b* that bypasses the second fixing unit 91 such that fixing is performed in the first fixing unit 81 but fixing is not performed in the second fixing unit 91.

The first fixing unit 81 and the second fixing unit 91 mentioned above may adopt a similar configuration, such that the first fixing unit 81 will be described below as an example. The first fixing unit 81 includes a fixing roller 82, or a fixing belt, that rotates while abutting against the surface of the recording material S having the toner image fixed thereto, and a pressure belt 83, or a pressure roller, that is in pressure contact with the fixing roller 82 and that forms a fixing nip portion. At least one of the fixing roller 82 and the pressure belt 83 is heated by a heater not shown. At the fixing nip portion formed by the fixing roller 82 and the pressure belt 83, the first fixing unit 81 applies heat and pressure to the recording material S while nipping and conveying the recording material S to which the toner image has been formed, to thereby fix the toner image onto the recording material S.

According to the present embodiment, the image forming apparatus 100 may perform duplex printing. In the case of simplex printing, the recording material S having the toner image fixed thereto is conveyed to a sheet discharge conveyance path 150 and discharged to the exterior of the image forming apparatus 100. In the case of duplex printing, the recording material S having the toner image fixed thereto is conveyed to a reverse conveyance path 600. The reverse conveyance path 600 is formed across the first casing 101*a* and the second casing 101*b*. In the reverse conveyance path 600, the recording material S is reversed through a switch-back operation, by which front and rear sides of the recording material S are reversed. The reversed recording material S is conveyed to the registration roller 121, and further conveyed to the secondary transfer portion T2 in a state where the rear side that has not been printed is arranged to face the intermediate transfer belt 130 by the registration roller 121.

In the secondary transfer portion T2, the full-color toner image formed on the intermediate transfer belt 130 is collectively secondarily transferred to the rear side of the recording material S. Thereafter, the toner image is fixed by the fixing unit 800 to the recording material S, and the sheet S is discharged to the exterior of the image forming apparatus 100 with the surface on which the image has been fixed immediately prior thereto, i.e., image forming surface, facing upward. The switching between the sheet discharge conveyance path 150 and the reverse conveyance path 600 is carried out by a conveyance path switching flapper 160. The present embodiment adopts a configuration in which two fixing units are provided, but the configuration may include only one fixing unit.

The finisher apparatus 500 is connected to the image forming apparatus 100 in a manner capable of having the recording material S conveyed thereto, and the recording material S discharged from the image forming apparatus 100 is conveyed to the finisher apparatus 500. The recording material S being conveyed to the finisher apparatus 500 is subjected to a postprocessing treatment by the finisher apparatus 500, such as a punching process in which holes are punched to the recording material S or a stapling process in which a plurality of recording materials S are bundled and stapled. The recording material S discharged from the finisher apparatus 500 is placed on either one of an upper sheet discharge tray 501 and a lower sheet discharge tray 502.

Comparison Example of Fan Unit and Support Configuration Thereof

Although not shown in FIG. 1, the image forming apparatus 100 described above may be provided with a fan unit for flowing air into the first casing 101*a* or the second casing 101*b* in order to perform heat exhaustion, cooling, air ventilation, dust collection, or suction and conveyance of the recording material S. Now, the configuration of the first casing 101*a* will be described with reference to FIG. 6, and a comparison example of a fan unit and a supporting configuration thereof will be described with reference to FIGS. 7 and 8. The second casing 101*b* may adopt a similar configuration as the first casing 101*a*, such that the description thereof will be omitted.

Figure 6:
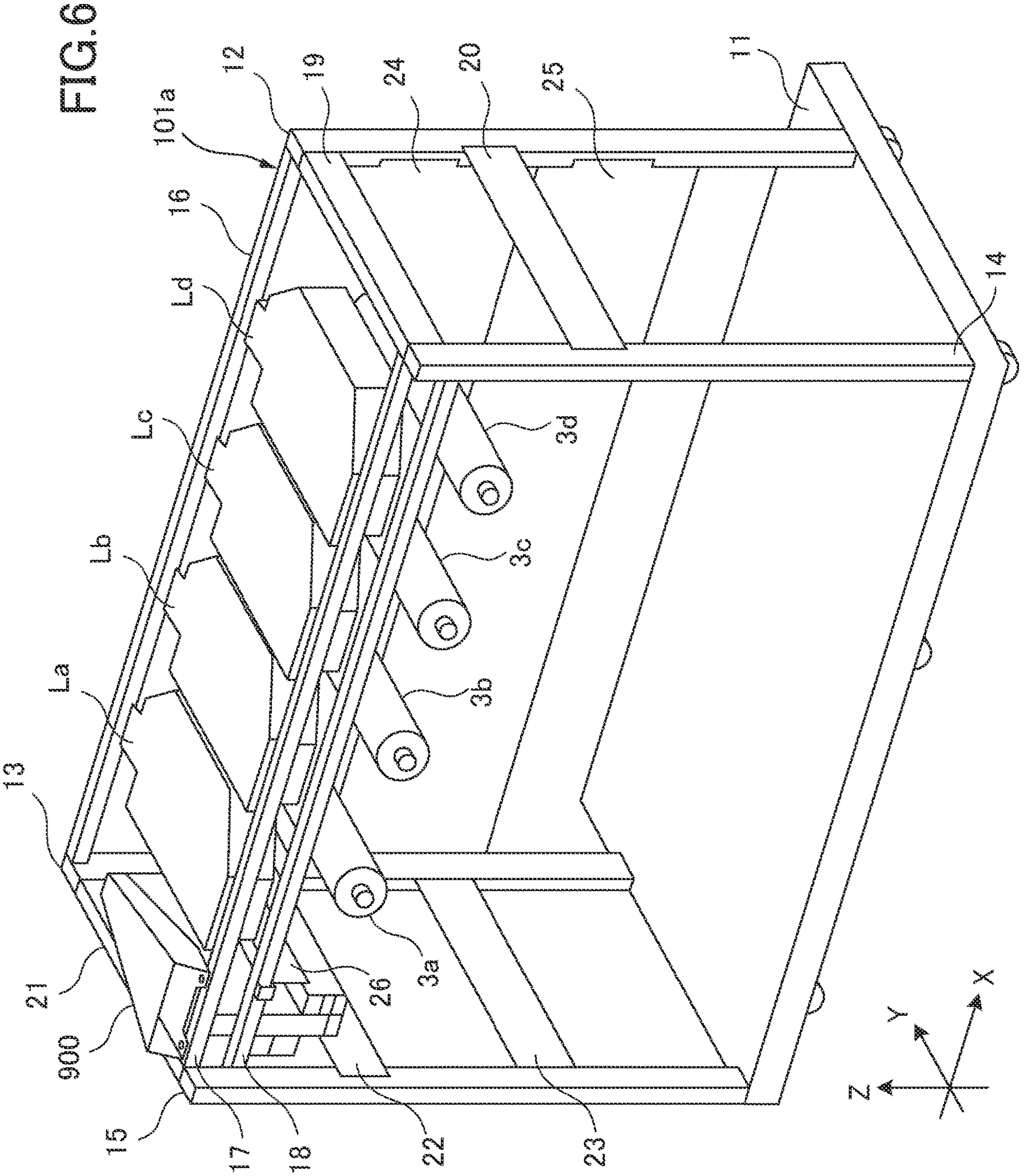
FIG. 6 is a perspective view illustrating a comparison example showing a first casing, a fan unit, and an exposing unit.

As illustrated in FIG. 6, the first casing 101*a* supporting the photosensitive drums 3*a* to 3*d* and the exposing units La to Ld includes a base plate 11, vertical frames 12 to 15 arranged at four corners, a transverse frame 16 arranged on a rear side, a transverse frame 17 arranged on a front side, and a transverse frame 18 arranged below and spaced apart from the transverse frame 17. The vertical frames 12 to 15 are disposed to extend upward from the base plate 11. The transverse frame 16 is linked to the vertical frames 12 and 13 arranged on right and left sides at the rear side, and the transverse frames 17 and 18 are linked to the vertical frames 14 and 15 arranged on right and left sides at the front side.

The exposing units La to Ld are supported at the front side by the transverse frame 17 and supported at the rear side by the transverse frame 16.

Further, the first casing 101*a* includes, as frames, stays 19 and 20 that link the vertical frame 12 and the vertical frame 14, stays 21, 22, and 23 that link the vertical frame 15 and the vertical frame 13, and a stay 26 that is stretched across the transverse frame 18 and a rear side plate 24. Further, the first casing 101*a* includes the rear side plates 24 and 25 that support the photosensitive drums 3*a* to 3*d* and the exposing units La to Ld at the rear side. The rear side plate 24 is attached to the vertical frames 12 and 13 and the transverse frame 16, and the rear side plate 25 is attached to the vertical frames 12 and 13. Further, a front side plate (not shown) similar to the rear side plate 24 may be attached to the vertical frames 14 and 15 at the front side so as to support the photosensitive drums 3*a* to 3*d* at the front side, for example.

Figure 7:
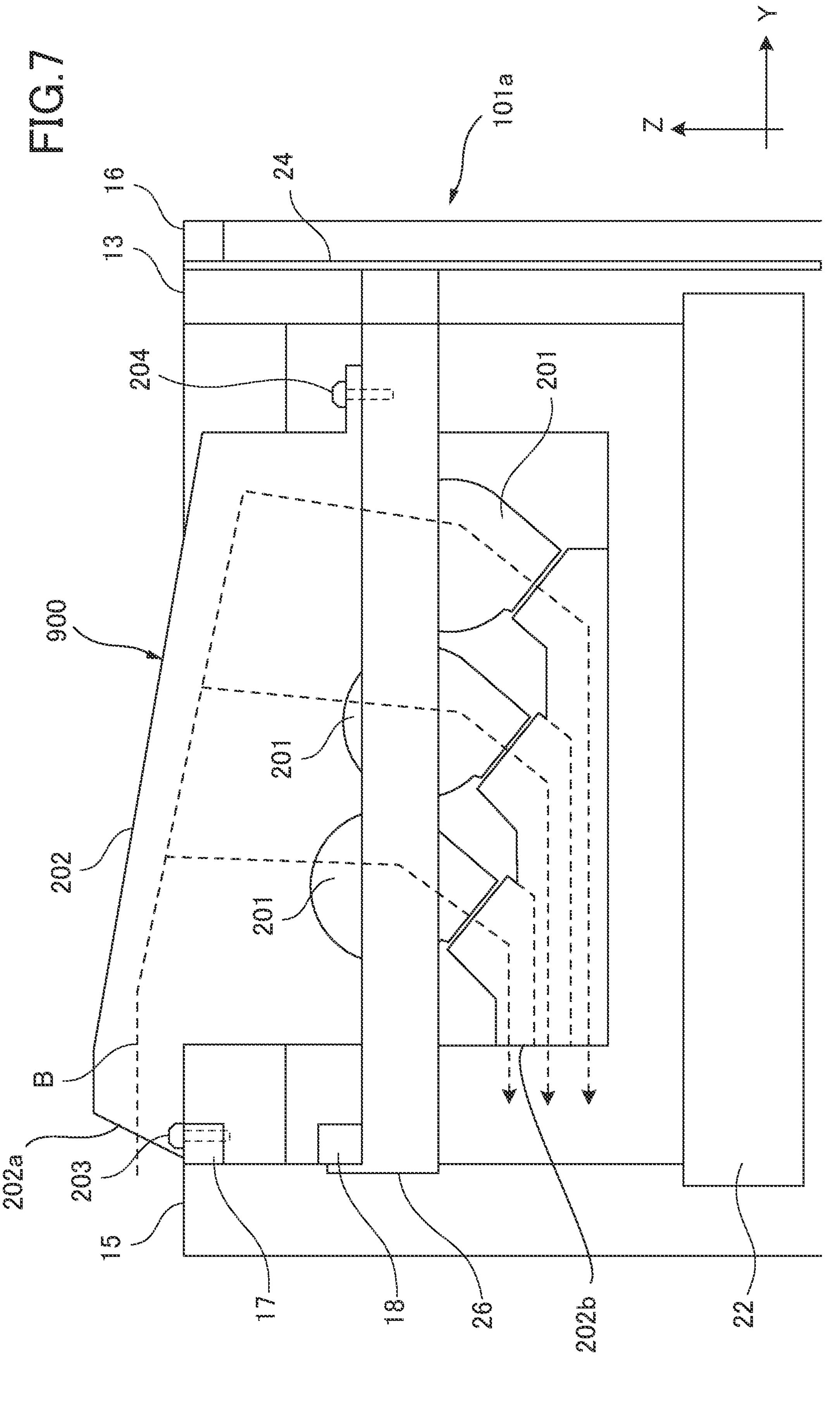
FIG. 7 is a side view illustrating a comparison example of a support configuration of a fan unit.

As illustrated in FIG. 7, a fan unit 900 includes a plurality of fans 201 and a single duct 202, wherein these fans 201 are arranged along a predetermined direction, which is a front-rear direction in the present example, and are fixed to a surface of the duct 202 by screws not shown. The fans 201 may each be a sirocco fan, for example. That is, the plurality of fans 201 include the first fan 201, and the second fans 201 that are aligned along the front-rear direction with respect to the first fan 201.

An air channel through which the air is flown by the fans 201 is formed within the duct 202, the air channel communicated to an air intake port 202*a* through which air is taken in from the exterior along with the operation of the fans 201 and an air discharge port 202*b* through which air is discharged into the first casing 101*a*. That is, the air taken in through the air intake port 202*a* is passed through the duct 202, discharged through the air discharge port 202*b*, and guided into the first casing 101*a*, the airflow of which is illustrated by dotted line arrows B. The fan unit 900 is arranged in the first casing 101*a* such that the air intake port 202*a* and the air discharge port 202*b* both face the front side, fixed at the front side to the transverse frame 17 by a screw 203, and fixed at the rear side to the stay 26 by a screw 204.

Figure 8:
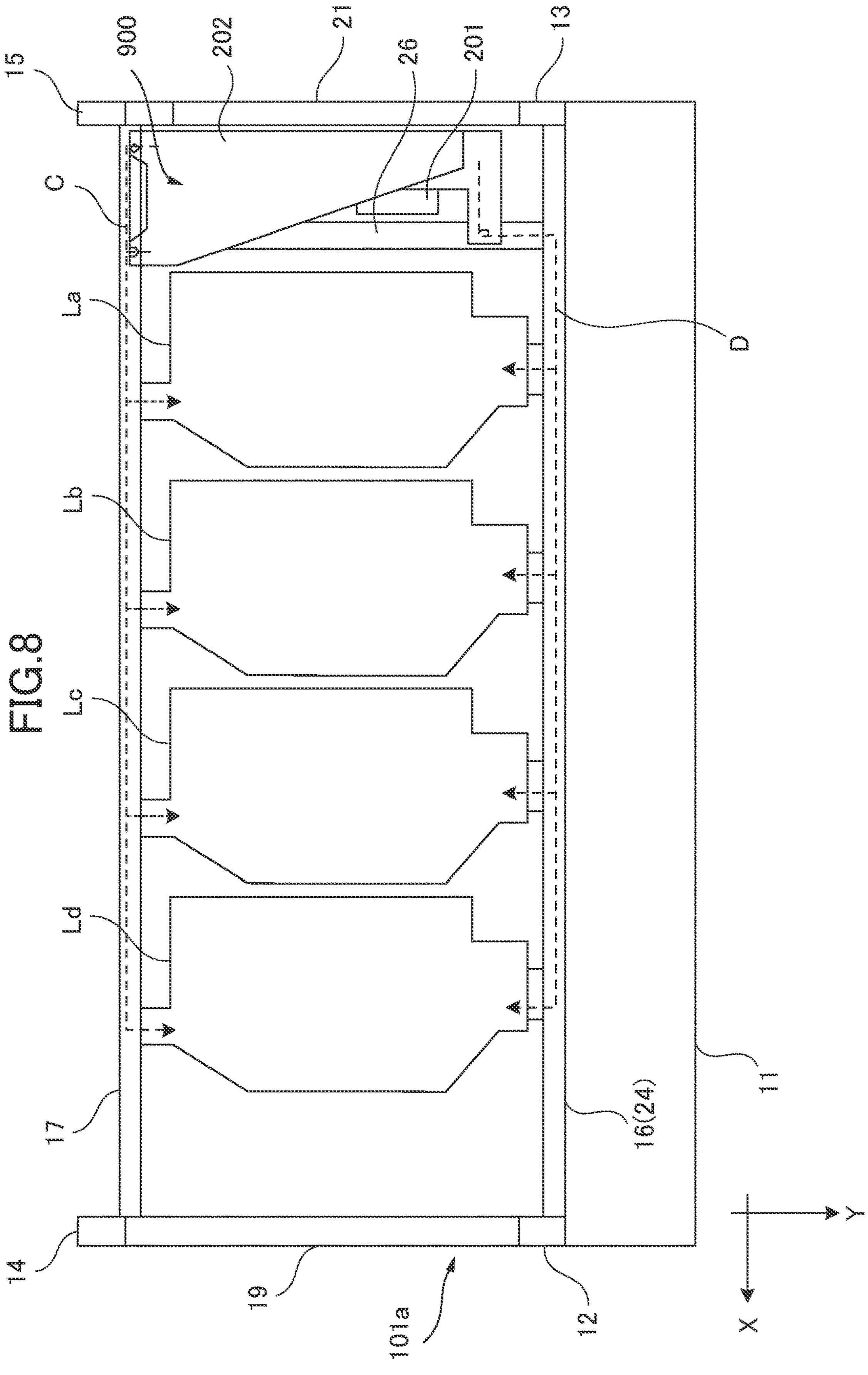
FIG. 8 is an upper view illustrating a propagation of vibration from the fan unit through a frame to an exposing unit according to the comparison example.

Arrows C and D illustrated by dotted lines in FIG. 8 denote a propagation of vibration according to the comparison example from the fan unit 900 via the transverse frame 17, the stay 26, and the transverse frame 16 to the exposing units La to Ld in a case where the fans 201 vibrate. As illustrated by arrow C, the vibration of the fans 201 is propagated from the fan unit 900 to the transverse frame 17 to which the fan unit 900 is fixed at the front side of the first casing 101*a*, and may cause the exposing units La to Ld to be vibrated. Further, as illustrated by the arrow D, the vibration of the fans 201 is propagated from the fan unit 900 through the stay 26 on which the fan unit 900 is fixed at the rear side of the first casing 101*a* to the rear side plate 24 and the transverse frame 16, and may cause the exposing units La to Ld to be vibrated.

The reflection mirrors La1 to Ld1 for adjusting the path of laser lights that form electrostatic latent images to the photosensitive drums 3*a* to 3*d* are disposed within the exposing units La to Ld (refer to FIG. 1). In the comparison example described above, the vibration of the fans 201 caused periodical vibration to be propagated to the exposing units La to Ld. Therefore, the reflection mirrors La1 to Ld1 vibrated, and the electrostatic latent images formed on the photosensitive drums 3*a* to 3*d* were periodically deviated from their desired positions, such that periodical image defects, so-called bandings, tended to occur on the recording material S. Therefore, as mentioned already, measures such as using thicker elastic members or increasing the number of elastic members were considered, but such measures will complicate the configuration for arranging the elastic members and increase costs.

Present Embodiment

Figure 2:
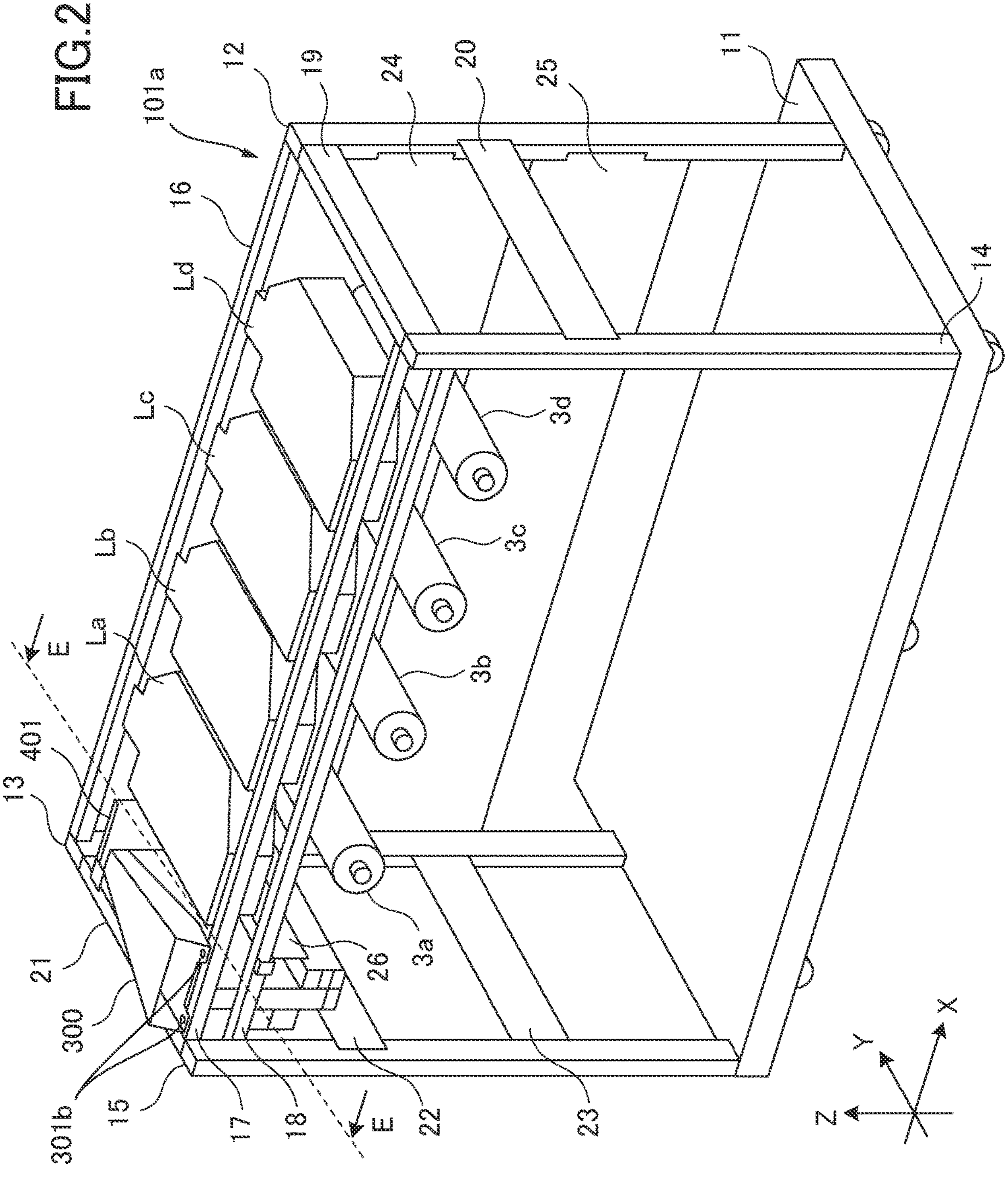
FIG. 2 is a perspective view illustrating a first casing, a fan unit, and an exposing unit.
Figure 3:
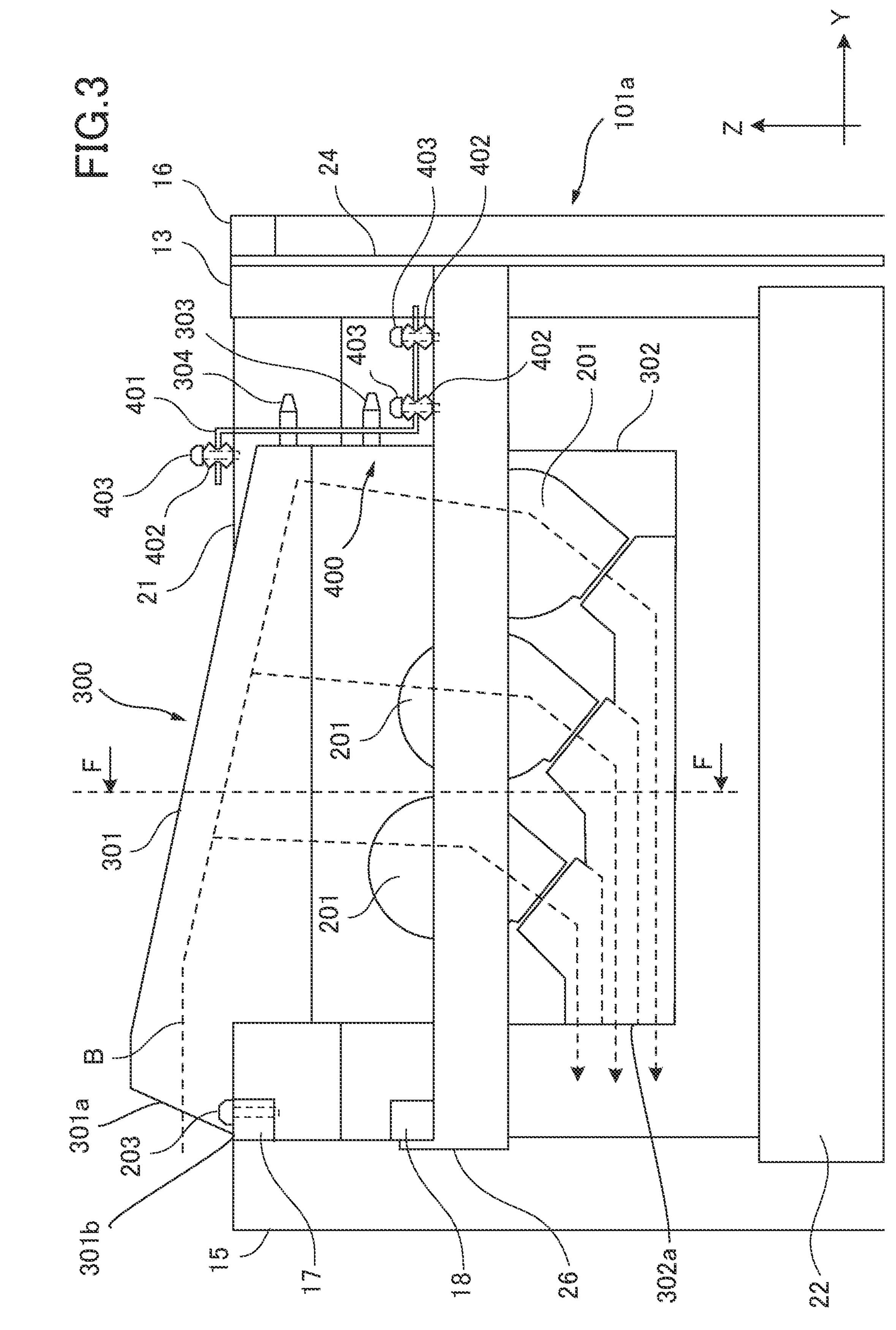
FIG. 3 is a side view illustrating a support configuration of a fan unit.
Figure 4:
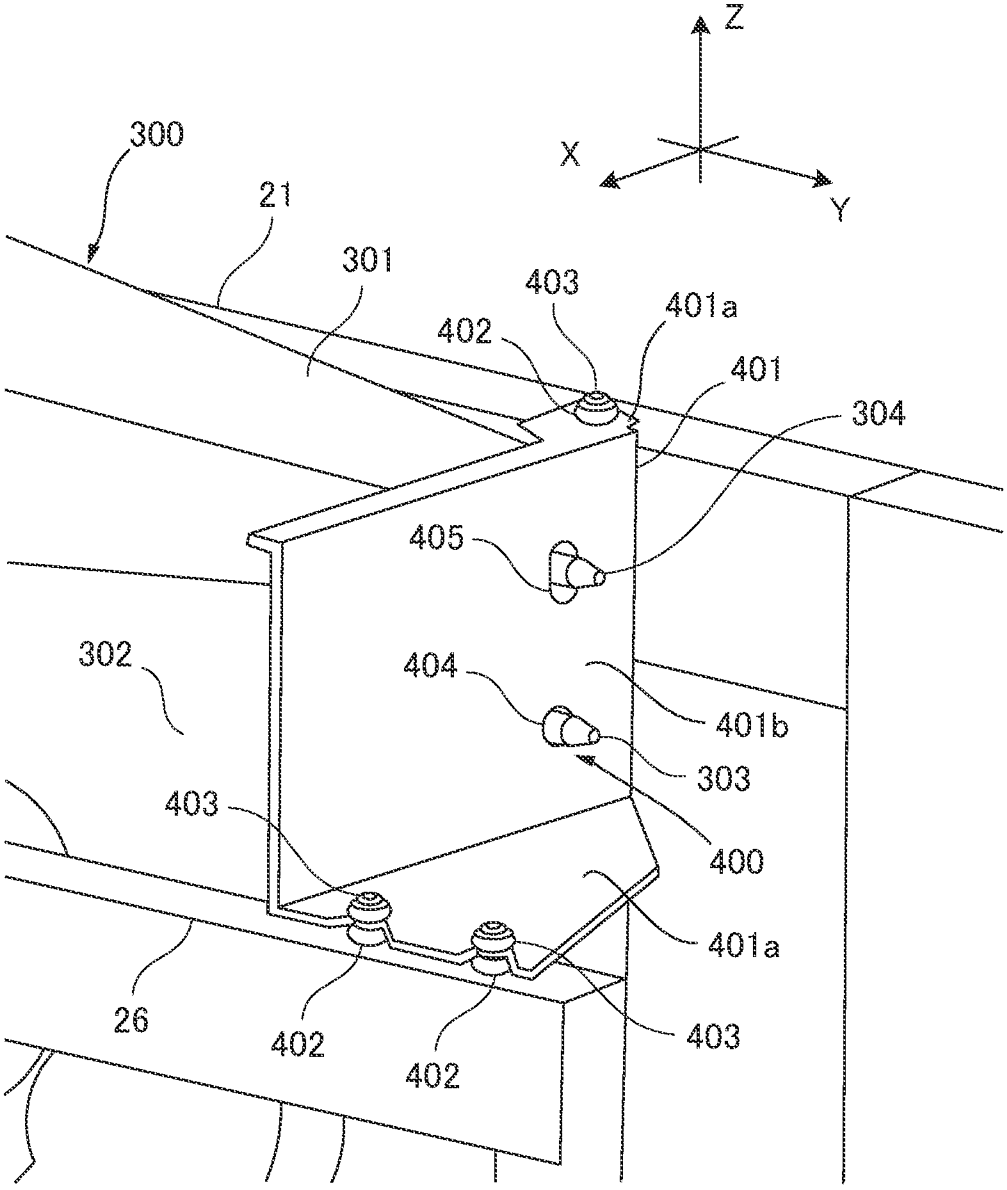
FIG. 4 is a perspective view illustrating a support member in enlarged view.

In view of the above-mentioned points, according to the present embodiment, the vibration of the fans 201 are less likely to be propagated via a fan unit 300 and the first casing 101*a* to the exposing units La to Ld. Hereafter, the fan unit 300 and a support configuration of the fan unit 300 for realizing the above object will be described with reference to FIGS. 2 to 5. In FIGS. 2 to 4, the configurations similar to the comparison example described above will be denoted with the same reference numbers, and descriptions thereof are omitted. The description of the configuration of the first casing 101*a* is similar to the comparison example described above (refer to FIG. 6), such that the description thereof is omitted.

As illustrated in FIG. 2, the fan unit 300 according to the present embodiment differs from the fan unit 900 of the comparison example described above in that the fan unit 300 is supported by a support member 401 at a rear side. FIG. 3 is a cross-sectional view illustrating a cross-sectional view cut at line E-E of FIG. 2. As illustrated in FIG. 3, the fan unit 300 according to the present embodiment differs from the fan unit 900 of the comparison example in that a duct that forms an air channel through which the air is flown by the plurality of fans 201 is composed of a first duct portion 301 and a second duct portion 302, and in that the second duct portion 302 is supported via a first supporting portion 360 (refer to FIG. 5) by the first duct portion 301. That is, the fan unit 300 includes the first duct portion 301 and the second duct portion 302 that form an air channel by being mutually connected, and the fans 201 that are arranged on the second duct portion 302 and that generate an airflow in the air channel.

As illustrated in FIG. 3, the fan unit 300 includes the plurality of fans 201, the first duct portion 301, and the second duct portion 302. The plurality of fans 201 serving as a first fan and a second fan are arranged along a predetermined direction, which according to the present example is the front-rear direction, and they are fixed to the surface of the second duct portion 302 by screws not shown.

The first duct portion 301 includes an air intake port 301*a* through which air is taken in by the operation of the fans 201, and the second duct portion 302 includes an air discharge port 302*a* through which air is discharged into the first casing 101*a*. An air channel through which the air is flown by the fans 201 is formed in the first duct portion 301 and the second duct portion 302. The air taken in through the air intake port 301*a* is passed through the first duct portion 301 and the second duct portion 302, discharged through the air discharge port 302*a*, and guided into the first casing 101*a*. The flow of air is illustrated by the dotted line arrow B.

The fan unit 300 is arranged such that the air intake port 301*a* and the air discharge port 302*a* are directed toward the front side in the first casing 101*a*. The fan unit 300 has the first duct portion 301 fixed to the transverse frame 17 via the screws 203 at the front side. The first duct portion 301 includes a fixing portion 301*b* that is fixed to the transverse frame 17. The fixing portion 301*b* is formed to fix the first end side of the first duct portion 301 in the predetermined direction, or front-rear direction, to the transverse frame 17.

That is, the fixing portion 301*b* of the first duct portion 301 is fixed to the first casing 101*a* at the front side in the front-rear direction.

The fan unit 300 has the second duct portion 302 supported via a second supporting portion 400 by the support member 401 at the rear side. The support member 401 is arranged further toward the second end side in the predetermined direction, or front-rear direction, than the second duct portion 302. The second supporting portion 400 includes a projecting support pin 303 and a round hole portion 404 described below (refer to FIG. 4). In the present embodiment, the first duct portion 301 is fixed to the transverse frame 17 by the screw 203 at the front side and the second duct portion 302 is supported on the support member 401 by the projecting support pin 303 at the rear side, such that force is mutually applied by gravity to the first duct portion 301 and the second duct portion 302, the first duct portion 301 receiving force relatively in a direction inclining the first duct portion 301 downward toward the right side, and the second duct portion 302 receiving force relatively in a direction inclining the second duct portion 302 upward toward the right side.

As illustrated in FIG. 4, the support member 401 includes upper and lower support member-side fixing portions 401*a* that are fixed via elastic members 402 to the stays 21 and 26, and an extended portion 401*b* that is a section extended in a direction, which according to the present example is the up-down direction, orthogonal to the predetermined direction and that has the round hole portion 404 formed thereto. The support member 401 is formed in this manner, for example, by bending a sheet metal in a cranked shape. That is, each of the support member-side fixing portions 401*a* is one example of a first portion, and it is fixed to the first casing 101*a* via the elastic members 402. Further, the extended portion 401*b* is one example of a second portion, and it is formed to extend from both support member-side fixing portions 401*a* in the up-down direction and to which the round hole portion 404 described below is formed.

The support member 401 is supported by the stays 21 and 26 via the elastic members 402, and the elastic members 402 are disposed on the stays 21 and 26 via screws 403. A cylindrical spacer (not shown) is disposed in the inner side of the elastic members 402 to maintain the height of the elastic members 402, which prevents the elastic members 402 from being excessively crushed by the screws 403 when the screws 403 are engaged, and causing deterioration of the elasticity of the elastic members 402. The elastic members 402 may be an expanded foam that is created by foaming synthetic rubber, for example.

The projecting support pin 303 serving as a support projection that supports the fan unit 300 is disposed on the second duct portion 302 in a projected manner from an end portion at the rear side toward the support member 401. In contrast, the support member 401 has the round hole portion 404 formed thereto, which is capable of having the projecting support pin 303 loosely fit thereto in the Y axis direction, and the second duct portion 302 is supported by the support member 401 via the projecting support pin 303 through the round hole portion 404 serving as a support hole portion. The round hole portion 404 defines a round hole serving as a support hole. In the present embodiment, for example, a diameter of the projecting support pin 303 is set to 8 mm and a diameter of the round hole portion 404 is set to 8.4 mm, such that the second duct portion 302 is movably supported not only in the front-rear direction but also in the right-left direction and the up-down direction with respect to the support member 401. That is, the second duct portion 302 is not fixed to the first casing 101*a*. In a state where the projecting support pin 303 is inserted to the round hole of the round hole portion 404, a gap is formed between the projecting support pin 303 and the round hole portion 404. In a state where the fan unit 300 is not vibrated, the projecting support pin 303 is in contact with the round hole portion 404 at a lower side in the gravity direction. That is, in a state where the fans 201 are not operated, regarding a vertical direction, a lower part of the projecting support pin 303 and a lower part of the round hole portion 404 are abutted against one another in the vertical direction. By having the projecting support pin 303 inserted to the round hole of the round hole portion 404 at the rear side of the first casing 101*a*, the fan unit 300 is supported via the support member 401 by the first casing 101*a*.

An auxiliary positioning pin 304 that serves as a positioning projection for maintaining the position of the fan unit 300 is disposed on the first duct portion 301 in a manner projecting from the end portion at the rear side toward the support member 401. The auxiliary pin 304 is one example of a positioning projection, and it is arranged to protrude toward the same direction as the projecting support pin 303 at the rear side of the first duct portion 301. In contrast, the support member 401 has a long hole portion 405 formed thereto as an insertion hole to which the auxiliary positioning pin 304 of the first duct portion 301 may be inserted in the Y axis direction. The long hole portion 405 is one example of a positioning hole portion, and to which the auxiliary pin 304 is inserted. The long hole portion 405 defines a long hole serving as a positioning hole. By having the auxiliary positioning pin 304 inserted to the long hole of the long hole portion 405, a second end portion of the first duct portion 301 may be positioned with respect to a direction orthogonal to a predetermined direction and the vertical direction, that is, right-left direction.

However, according to the present embodiment, the fan unit 300 is supported via the projecting support pin 303 by the support member 401, but not supported via the auxiliary positioning pin 304 by the support member 401. That is, according to the present embodiment, a diameter of the auxiliary positioning pin 304 and a width, i.e., length in the X-axis direction, of the long hole portion 405 approximately correspond, and a height, i.e., length in the Z-axis direction, of the long hole portion 405 is formed greater than the diameter of the round hole portion 404. That is, an inner diameter of the long hole portion 405 in the Z-axis direction is greater than an inner diameter of the round hole portion 404 in the Z-axis direction. In a state where the fan unit 300 is not vibrating, the auxiliary positioning pin 304 is not in contact with the long hole portion 405 at the lower side in the gravity direction. That is, in a state where the fans 201 are not operating, the auxiliary pin 304 and the long hole portion 405 are spaced apart in the vertical direction. Thereby, a movement in the right-left direction of the first duct portion 301 with respect to the support member 401 is regulated by the long hole portion 405, but a movement in the front-rear direction and the up-down direction with respect to the support member 401 is enabled. By having the first duct portion 301 regulated of its movement in the right-left direction by the long hole portion 405, it becomes possible to prevent the fan unit 300 from rotating in a Y-axis direction about the projecting support pin 303 around the Y axis and causing deviation of the position thereof.

According to the support configuration of the fan unit 300 described above, at a supporting portion where the projecting support pin 303 is fit to the round hole portion 404, the second duct portion 302 may move in the right-left direction, the up-down direction, the direction of rotation about the X axis serving as a central axis, and the direction of rotation about the Z axis serving as a central axis relatively with respect to the support member 401, corresponding to a distance of the gap formed between the projecting support pin 303 and the round hole portion 404. Therefore, even if vibration occurs to the projecting support pin 303 in these directions by the fans 201, the propagation of vibration from the second duct portion 302 to the support member 401 is suppressed. Further, the support member 401 is supported by the elastic members 402 having elasticity. Therefore, vibration in all directions can be absorbed by the elastic members 402, and propagation of vibration from the support member 401 to the stays 21 and 26 can be suppressed. Thereby, the propagation of vibration from the fan unit 300 to the stays 21 and 26 that is caused by the vibration of the fans 201 is suppressed by the second supporting portion 400 and the elastic members 402 that serve as a fitting and supporting portion of the projecting support pin 303 and the round hole portion 404.

Figure 5:
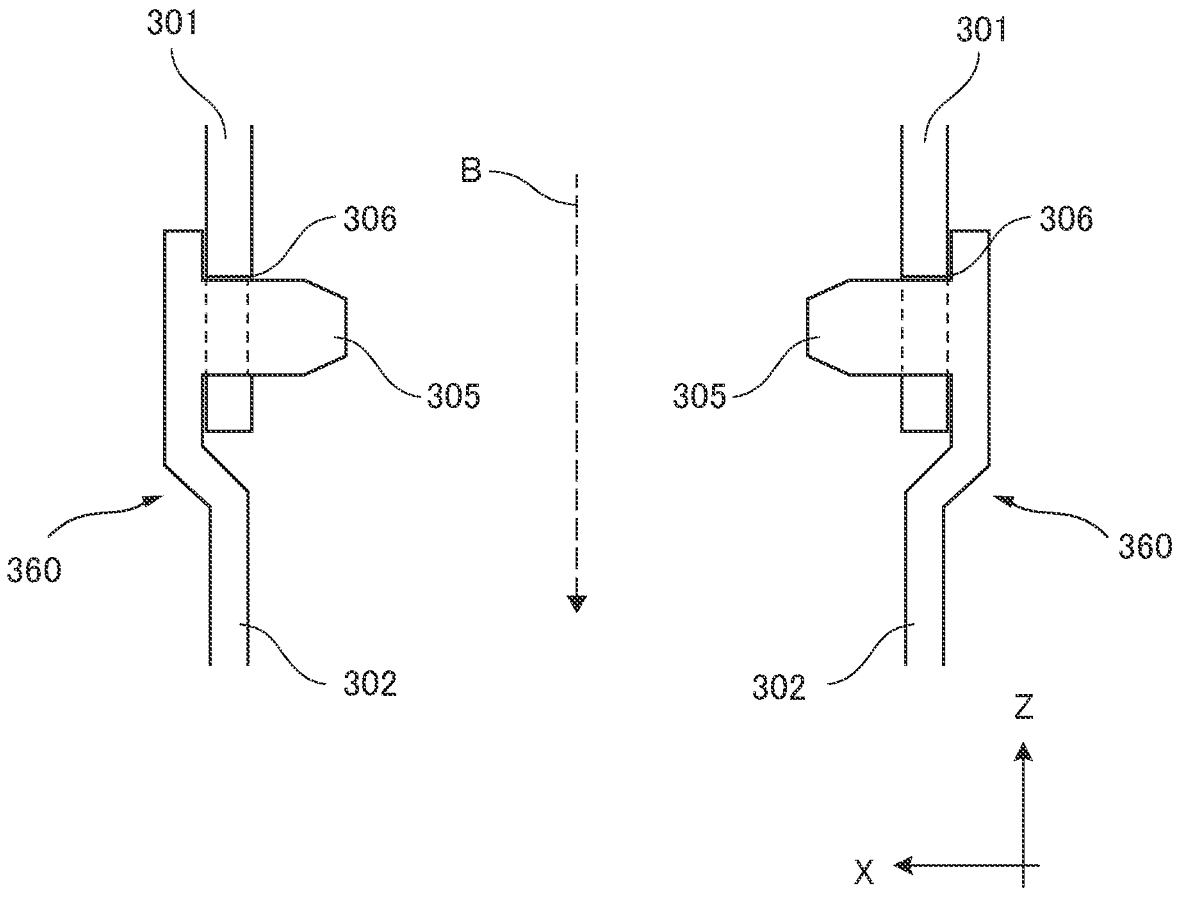
FIG. 5 is a cross-sectional view illustrating a first supporting portion between a first duct and a second duct.

FIG. 5 is a cross-sectional view illustrating a cross-section cut at line F-F of FIG. 3. In the present embodiment, as illustrated in FIG. 5, the second duct portion 302 is supported via the first supporting portion 360 by the first duct portion 301. The first supporting portion 360 includes connecting projections 305 serving as first projections that are formed on an inner side of the second duct portion 302 to protrude in the right-left direction, and connecting hole portions 306 serving as first hole portions formed on the first duct portion 301. The connecting projections 305 are fit to the connecting hole portions 306. The connecting hole portions 306 define connecting holes. The gap between the connecting projections 305 and the connecting hole portions 306 is minute, such that air passing through the first duct portion 301 and the second duct portion 302 will not easily leak to the exterior. The gap between the connecting projections 305 and the connecting hole portions 306 may be 0.05 mm, for example. Further, it may be possible to arrange a sponge material for preventing leakage of air so as not to obstruct relative movement of the first duct portion 301 and the second duct portion 302.

A plurality of connecting projections 305 and connecting hole portions 306 are arranged along the right-left direction, and a direction in which the plurality of connecting projections 305 fit to each of the plurality of connecting hole portions 306, which according to the present example is the right-left direction, is approximately parallel to each other. The fitting direction is set to be the same according to the present embodiment, since if the first duct portion 301 and the second duct portion 302 are fit to each other through multiple fitting directions, the freedom of relative movement of the first duct portion 301 and the second duct portion 302 is reduced, and there is a risk that the effect of suppression of propagation of vibration may not be achieved. That is, the connecting projections 305 include a first connecting projection 305 and a second connecting projection 305. The connecting hole portions 306 includes a first connecting hole portion 306 to which the first connecting projection 305 is fit, and a second connecting hole portion 306 to which the second connecting projection 305 is fit. A fitting direction of the first connecting projections 305 to the first connecting hole portion 306 and a fitting direction of the second connecting projections 305 to the second connecting hole portion 306 are approximately parallel.

As described above, according to the present embodiment, the duct of the fan unit 300 is formed of the first duct portion 301 and the second duct portion 302 that are separate members, wherein the first duct portion 301 is fixed to the first casing 101*a*, and the second duct portion 302 is supported by the support member 401. The duct of the fan unit 300 is formed by connecting the first duct portion 301 to the second duct portion 302 which is a separate member. The first duct portion 301 and the second duct portion 302 are fit to each other with a minute gap formed between the connecting projections 305 and the connecting hole portions 306. Therefore, even if the second duct portion 302 is vibrated, the propagation of vibration from the second duct portion 302 to the first duct portion 301 is suppressed by the gap formed between the connecting projections 305 and the connecting hole portions 306.

As described, by having the first duct portion 301 and the second duct portion 302 fit and supported in a single axis direction, the second duct portion 302 may be moved in parallel or moved in rotation relatively independently with respect to the first duct portion 301 within the range of the gap of the first supporting portion 360. Therefore, compared to a case in which the first duct portion 301 and the second duct portion 302 are fixed to each other through screw engagement, for example, the vibration of the second duct portion 302 is less likely to be propagated to the first duct portion 301.

Further, the support member 401 is supported via the elastic members 402 to the first casing 101*a*. In a case where the support member 401 is vibrated, the elastic members 402 are deformed, such that even if the support member 401 is vibrated, the vibration of the support member 401 is less likely to be propagated to the first casing 101*a*. Thereby, according to the present embodiment, even if the first duct portion 301 is fixed to the first casing 101*a*, the propagation of vibration caused by the vibration of the fans 201 from the fan unit 300 to the first casing 101*a* will be suppressed. Thereby, the present embodiment can suppress the vibration of the fans 201 from being propagated from the fan unit 300 to the first casing 101*a* by a simple configuration.

According to the present invention, the vibration of the fans can be suppressed from being propagated to the frame by a simple configuration.

Other Embodiments

The above-mentioned embodiment was illustrated based on an example in which the projecting support pin 303 is disposed on the second duct portion 302 and the round hole portion 404 is formed on the support member 401 (refer to FIG. 4), but the present technique is not limited thereto. For example, in contrast to the above-described example, a projecting support pin may be disposed on the support member 401 and a round hole may be formed on the second duct portion 302. That is, at a rear side in the front-rear direction, one of the second duct portion 302 and the support member 401 may have a projecting support pin and the other one of the second duct portion 302 and the support member 401 may have a round hole to which the projecting support pin is to be inserted provided thereto. Further, the above-mentioned embodiment was illustrated based on an example in which the connecting projections 305 are disposed on the second duct portion 302 and the connecting hole portions 306 are formed on the first duct portion 301 (refer to FIG. 5), but the present technique is not limited thereto. For example, in contrast to the above-mentioned example, the connecting projections may be disposed on the first duct portion 301 and connecting hole portions may be formed on the second duct portion 302. That is, one of the first duct portion 301 and the second duct portion 302 may have connecting projections formed thereto and the other one of the first duct portion 301 and the second duct portion 302 may have connecting hole portions to which the connecting projections are to be inserted provided thereto. Thereby, by having the connecting projections inserted to the connecting hole portions, the first duct portion 301 and the second duct portion 302 are connected.

It is not necessary that the auxiliary positioning pin 304 is disposed on the first duct portion 301, but it is more preferable for the auxiliary positioning pin 304 to be provided since the position of the fan unit 300 will be stabilized. Meanwhile, the projecting support pin 303 is necessarily provided on the second duct portion 302. This is because the plurality of fans 201 are fixed to the second duct portion 302, and the weight of the second duct portion 302 including the fans 201 will be heavier than the first duct portion 301, such that if the projecting support pin 303 is not provided, it becomes difficult to support the fan unit 300 stably by the support member 401. If the projecting support pin 303 is not disposed on the second duct portion 302 and the second duct portion 302 is supported on the support member 401 by only the auxiliary positioning pin 304 disposed on the first duct portion 301, the second duct portion 302 having a heavy weight may be vibrated greatly by the vibration of the fans 201. This is not preferable since the vibration of the second duct portion 302 may be propagated through the first duct portion 301 to the first casing 101*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-156436, filed Sep. 29, 2022 which is hereby incorporated by reference herein in its entirety.

What is claimed is:

1. An image forming apparatus comprising:

a casing supporting a process unit configured to execute at least a part of an image forming process;

a fan unit including a first duct and a second duct forming an air channel by being mutually connected, and a fan attached to the second duct and configured to generate an airflow in the air channel;

a support member interposed between the casing and the fan unit, and supporting the fan unit with respect to the casing; and an elastic member arranged between the support member and the casing, wherein the first duct includes a fixing portion fixed to the casing, the fixing portion being provided on a first side of the fan unit in a first direction, wherein one of the second duct and the support member includes a support projection provided on a second side, opposite to the first side, of the fan unit in the first direction, and the other one of the second duct and the support member includes a support hole portion defining a support hole to which the support projection is inserted, and wherein, on the second side, the fan unit is supported on the casing via the support member in a state where the support projection is inserted to the support hole and a gap is provided between the support projection and the support hole portion.

2. The image forming apparatus according to claim 1, wherein one of the first duct and the second duct includes a connecting projection, wherein the other one of the first duct and the second duct includes a connecting hole portion defining a connecting hole to which the connecting projection is inserted, and wherein the first duct and the second duct are connected by inserting the connecting projection to the connecting hole.

3. The image forming apparatus according to claim 1, wherein the support projection projects in the first direction and is provided on the second duct, wherein the support member includes a first portion fixed to the casing via the elastic member, and a second portion extended from the first portion in a second direction intersecting with the first direction, and wherein the support hole portion is provided on the second portion of the support member.

4. The image forming apparatus according to claim 3, wherein the first duct includes a positioning projection projecting in the first direction, the positioning projection being provided on the second side of the fan unit in the first direction, wherein the second portion includes a positioning hole portion defining a positioning hole to which the positioning projection is inserted, and wherein, by inserting the positioning projection to the positioning hole, a position of the first duct is regulated in a third direction intersecting with each of the first direction and the second direction.

5. The image forming apparatus according to claim 4, wherein an inner diameter of the positioning hole portion in the second direction is greater than an inner diameter of the support hole portion in the second direction.

6. The image forming apparatus according to claim 4, wherein, in a state where the fan is not operating, regarding a vertical direction, a lower part of the support projection and a lower part of the support hole portion are abutted against each other in the vertical direction, and wherein, in the state where the fan is not operating, the positioning projection and the positioning hole portion are separated from each other in the vertical direction.

7. The image forming apparatus according to claim 2, wherein the connecting projection is a first connecting projection, wherein the connecting hole portion is a first connecting hole portion, wherein one of the first duct and the second duct includes a second connecting projection, wherein the other one of the first duct and the second duct includes a second connecting hole portion defining a second connecting hole to which the second connecting projection is inserted, and wherein a fitting direction of the first connecting projection to the first connecting hole portion and a fitting direction of the second connecting projection to the second connecting hole portion are approximately parallel.

8. The image forming apparatus according to claim 1, wherein the fan is a sirocco fan.

9. The image forming apparatus according to claim 1, wherein the process unit includes an exposing unit configured to irradiate a charged surface of a photosensitive drum with laser light to form an electrostatic latent image.

10. The image forming apparatus according to claim 1, wherein the fan is a first fan, and wherein the fan unit includes a second fan attached to the second duct, configured to generate an airflow in the air channel, and arranged in an aligned manner in the first direction with respect to the first fan.

* * * * *